United States Patent [19]

Rouèche

[11] 4,340,430
[45] Jul. 20, 1982

[54] AZO PIGMENTS, PROCESS FOR THEIR PRODUCTION AND THEIR USE

[75] Inventor: Armand Rouèche, Bottmingen, Switzerland

[73] Assignee: Ciba-Geigy Corporation, Ardsley, N.Y.

[21] Appl. No.: 174,994

[22] Filed: Aug. 4, 1980

[30] Foreign Application Priority Data

Aug. 17, 1979 [CH] Switzerland ............... 7559/79

[51] Int. Cl.³ .................. C08L 1/08; C09B 17/00
[52] U.S. Cl. ..................... 106/176; 106/193 P; 260/154; 524/100
[58] Field of Search ......... 106/176, 193; 260/154, 260/37 NP, 39 P, 38, 42.21, 40 R

[56] References Cited

FOREIGN PATENT DOCUMENTS

| | | | |
|---|---|---|---|
| 609277 | 11/1960 | Canada | 260/154 |
| 837337 | 6/1960 | United Kingdom | |
| 837338 | 6/1960 | United Kingdom | |
| 871624 | 6/1961 | United Kingdom | |
| 1071041 | 6/1967 | United Kingdom | 260/154 |
| 1180759 | 2/1970 | United Kingdom | 260/154 |

OTHER PUBLICATIONS

CA, 55, 2702e (1961).
Tanaka et al., *Study of Nucleic Acid Antagists*, Chem. & Phar. Bulletin, vol. 7, No. 1, Feb. 59.
Timmis et al., *Structure-Activity Relations in Two Series of Anti-Folic Acids*, J. Phar. Pharmacol., 9, 46 (1957), pp. 46-67.

*Primary Examiner*—Theodore Morris
*Attorney, Agent, or Firm*—Luther A. R. Hall

[57] ABSTRACT

The present invention relates to valuable novel azo pigments of the formula

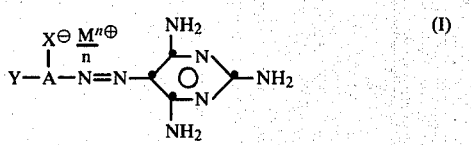

wherein A is a benzene residue, X is a $SO_3$ or $CO_2$ group, Y is a substituent that does not confer solubility in water, M is a monovalent or bivalent metal atom, and n is 1 or 2. Examples of substituents that do not confer solubility in water are: halogen, e.g. chlorine or bromine, methyl, $C_1$-$C_4$ alkoxy, cyano, alkanoylamino containing 1 to 4 carbon atoms, and especially nitro and trifluoromethyl. In addition to containing the specified substituents, the benzene residue A can contain further substituents, e.g. chlorine atoms or methyl groups. Suitable metals are monovalent metals such as alkali metals, e.g. Na, K or Li, but preferably bivalent metals such as Mg, Ca, Sr, Ba, Mn, Co, Ni, Cu or Zn. However, M can also comprises mixtures of such metals. The novel pigments produce in plastics materials yellow to red colorations of excellent fastness to light, migration and atmospheric influences and also excellent heat resistance.

9 Claims, No Drawings

AZO PIGMENTS, PROCESS FOR THEIR PRODUCTION AND THEIR USE

The present invention relates to valuable novel azo pigments of the formula

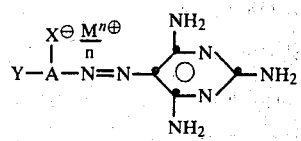
(I)

wherein A is a benzene residue, X is a $SO_3$ or $CO_2$ group, Y is a substituent that does not confer solubility in water, M is a monovalent or bivalent metal atom, and n is 1 or 2.

Examples of substituents that do not confer solubility in water are: halogen, e.g. chlorine or bromine, methyl, $C_1$–$C_4$alkoxy, cyano, alkanoylamino containing 1 to 4 carbon atoms, and especially nitro and trifluoromethyl. In addition to containing the specified substituents, the benzene residue A can contain further substituents, e.g. chlorine atoms or methyl groups.

Suitable metals are monovalent metals such as alkali metals, e.g. Na, K or Li, but preferably bivalent metals such as Mg, Ca, Sr, Ba, Mn, Co, Ni, Cu or Zn. However, M can also comprises mixtures of such metals.

Particularly interesting pigments are those of the formula

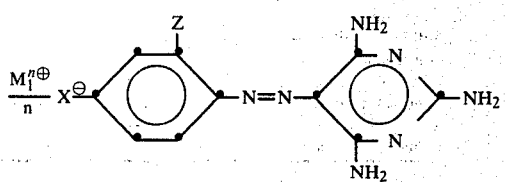
(III)

wherein Z is a trifluoromethyl group or especially a nitro group, X is a $SO_3$ or $CO_2$ group, and $M_1$ is Na, K, Ba, Ca, Mg, Ni or Co, and n is 1 or 2.

The pigments of the formula I are obtained by reacting a compound of the formula

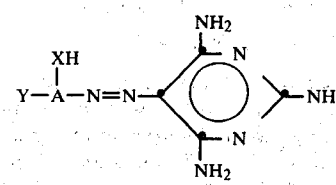
(IV)

with agents that donate monovalent or bivalent metals.

The compound of the formula IV is in turn obtained by coupling a diazo compound of the amine of the formula

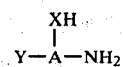
(V)

especially an amine of the formula

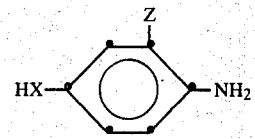
(VI)

with 2,4,6-triaminopyrimidine.

Examples of suitable amines are: 2-chloroaniline-5-sulfonic acid, 4-chloroaniline-2-sulfonic acid, 4-methylaniline-2-sulfonic acid, 4-methoxyaniline-2-sulfonic acid, 4-chloro-5-methylaniline-2-sulfonic acid, 4-methyl-5-chloroaniline-2-sulfonic acid, 4-acetylaminoaniline-2-sulfonic acid, 2-acetylaminoaniline-6-sulfonic acid, 4-trifluoromethylaniline-2-sulfonic acid, 5-trifluoromethylaniline-2-sulfonic acid, 2-trifluoromethylaniline-4-sulfonic acid, 3-trifluoromethyl-4-chloroaniline-6-sulfonic acid, 4-nitroaniline-2-sulfonic acid, 2-nitroaniline-4-sulfonic acid, 3-nitro-4-aminobenzoic acid.

The diazotisation of the aminobenzenesulfonic or aminobenzenecarboxylic acids is carried out in conventional manner with sodium nitrite in aqueous-mineral acid medium. The coupling is advantageously carried out in weakly acid to alkaline medium.

Metallising is effected preferably by reacting the azo dyestuff sulfonic or carboxylic acids with the water-soluble salts of the above metals in aqueous solution or suspension, optionally in the presence of an organic solvent such as an aliphatic alcohol, a ketone, ether or carboxamide, at elevated temperature, preferably in the range from 65° to 100° C.

It is also possible to effect metallising in the presence of one of the customary carrier substances or substrates such as alumina, titanium dioxide, barium sulfate or lead sulfate.

Compared with the closest comparable prior art, namely the compound of the formula

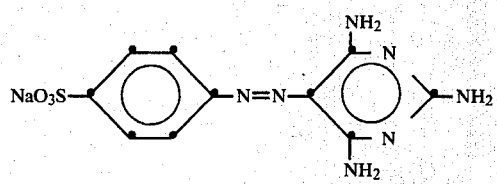

described in Chem. Bull. 7, pages 1–6 (1959), the pigments of the present invention are distinguished by substantially better fastness to light and atmospheric influences.

The pigments of the present invention are suitable for pigmenting organic material of high molecular weight, thermoplastics and thermosetting plastics, e.g. cellulose ethers and esters such as ethyl cellulose, nitrocellulose, cellulose acetate, cellulose butyrate, natural resins or synthetic resins such as polymerisation resins or condensation resins, e.g. aminoplasts, especially urea-formaldehyde and melamine-formaldehyde resins, alkyd resins, phenolic plastics, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, singly or in mixtures.

The high molecular weight compounds specified above can be both in the form of plastics, melts, or of spinning solutions, lacquers, paints or printing inks.

Depending on the end use, it is advantageous to use the novel pigments as toners or in the form of preparations.

The colourations obtained with the novel pigments are distinguished by excellent fastness properties, especially fastness to light, migration and atmospheric influences, as well as by heat resistance.

The invention is illustrated by the following Examples, in which parts and percentages are by weight unless otherwise indicated.

EXAMPLE 1

48 parts of 2-nitroaniline-4-sulfonic acid are dissolved in 750 parts by volume of water at 30°–35° C. with 50 parts by volume of 30% sodium hydroxide. After filtration with 1 part of decolourising carbon, 110 parts by volume of 30% hydrochloric are rapidly stirred into the clear solution. The suspension thereby obtained is cooled to 0° C. and then 50 parts by volume of 4 N sodium nitrite solution is introduced at 0°–5° C. in the course of 15 minutes. The diazotisation is complete after 15 minutes. Excess nitrous acid is destroyed with urea or sulfamic acid and the diazo suspension is adjusted to a pH value of 4 to 4.5 with sodium acetate. Then a solution of 25 parts of 2,4,6-triaminopyrimidine-1,3 in 600 parts by volume of water is added to the diazo suspension in the course of 1 hour, whereupon the temperature of the reaction mixture rises to 15°–20° C. Stirring is continued until the coupling is complete and the coupling mixture is then warmed to 40°–45° C. in the course of 1 hour, and then filtered. The filter cake is washed with water until as salt-free as possible.

44 parts of the filter residue (16.5% aqueous paste, corresponding to 7.2 parts of dry azo dyestuff sulfonic acid) are then suspended in 260 parts by volume of water. After heating to 70°–75° C., the suspension is adjusted to a pH value of about 10 with 25% NH4OH and then a solution of 2 parts of magnesium chloride hexahydrate in 30 parts of water is added. After stirring for 10 hours at 90°–95° C., the pigment suspension is filtered hot and the filter cake is washed with hot water until no more chlorine ions can be detected in the filtrate, and then dried in vacuo at 100° C. Yield: 6.3 parts of an orange pigment dye of the formula

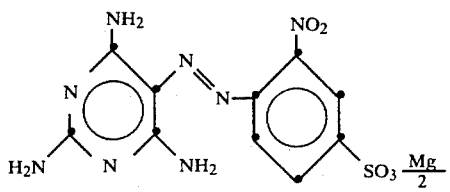

The pigment contains 4 moles of water of crystallisation.

Elemental analysis:

| C % | 29.4/29.5 | calculated: | C % | 29.92 |
|---|---|---|---|---|
| H % | 3.2/3.3 | (with 4 moles | H % | 3.26 |
| N % | 28.0/27.9 | of H2O) | N % | 27.91 |
| S % | 8.1 | | S % | 7.99 |
| Mg % | 3.08 | | Mg % | 3.03 |

The pigment colours polyvinyl chloride in red shades of very good fastness to migration and light.

EXAMPLES 2–24

The table lists further pigments which are obtained by diazotising the aminosulfonic acids of column I, coupling with 2,4,6-triaminopyrimidine, and metallising with a water-soluble salt of the metals listed in column II. Column III indicates the shade of polyvinyl chloride sheeting coloured with 0.2% of these pigments.

TABLE

| No. | Diazo component | Metal | Shade |
|---|---|---|---|
| 2 | 2-nitroaniline-4-sulfonic acid | Na | orange |
| 3 | 2-nitroaniline-4-sulfonic acid | K | orange |
| 4 | 2-nitroaniline-4-sulfonic acid | Li | reddish orange |
| 5 | 2-nitroaniline-4-sulfonic acid | Sr | orange |
| 6 | 2-nitroaniline-4-sulfonic acid | Ca | orange |
| 7 | 2-nitroaniline-4-sulfonic acid | Ba | orange |
| 8 | 2-nitroaniline-4-carboxylic acid | Na | orange |
| 9 | 2-nitroaniline-4-carboxylic acid | Ca | orange |
| 10 | 2-nitroaniline-4-carboxylic acid | Mg | orange |
| 11 | 2-nitroaniline-4-carboxylic acid | Ba | orange |
| 12 | 2-nitroaniline-4-carboxylic acid | Co | orange |
| 13 | 2-nitroaniline-4-carboxylic acid | Ni | orange |
| 14 | 2-nitroaniline-4-carboxylic acid | Cu | orange |
| 15 | 4-nitroaniline-2-sulfonic acid | K | red |
| 16 | 4-nitroaniline-2-sulfonic acid | Na | brown |
| 17 | 2,5-dichloroaniline-4-sulfonic acid | K | yellow |
| 18 | 2,5-dichloroaniline-4-sulfonic acid | Mg | yellow |
| 19 | 2,5-dichloroaniline-4-sulfonic acid | Ca | yellow |
| 20 | 2,5-dichloroaniline-4-sulfonic acid | Sr | yellow |
| 21 | aniline-2,4-disulfonic acid | Co | yellow |
| 22 | aniline-2,4-disulfonic acid | Zn | yellow |
| 23 | 3-aminophthalic acid | Ni | yellow |
| 24 | 3-aminophthalic acid | Co | brown |

EXAMPLE 25

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The orange colouration obtained is strong and fast to migration and light.

EXAMPLE 26

15 g of collodion cotton containing 35% of butanol, 15 g of phthalate resin modified with castor oil, 15 g of a 70% butanolic solution of a urea varnish gum, 20 g of butyl acetate, 10 g of glycol monoethyl ether, 20 g of toluene and 5 g of alcohol are processed to a lacquer. This lacquer is then pigmented with 2 g of the colourant of Example 1 and 2 g of titanium dioxide (rutile) and ground. The lacquer is sprayed onto cardboard and dried, giving an orange coating of very good fastness to light and overstripe bleeding and very good resistance to atmospheric influences.

EXAMPLE 27

To 100 g of a stoving lacquer consisting of 58.5 g of a 60% solution of a coconut alkyd resin in xylene, 23 g of a 65% solution of a melamine varnish gum in butanol, 17 g of xylene and 1.5 g of butanol, are added 1 g of the colourant of Example 1 and 5 g of titanium dioxide. The mixture is ground for 48 hours in a ball mill and the pigmented lacquer is sprayed onto a clean metal surface. After stoving at 120° C., an orange finish of good fastness to light and overstripe bleeding and good resistance to atmospheric influences is obtained.

What is claimed is:

1. An azo pigment of the formula

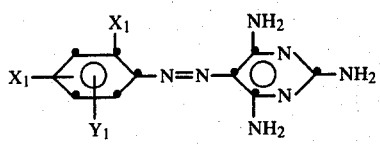

wherein one $X_1$ is a nitro group, a chlorine atom, a sulfo group or a trifluoromethyl group, and the other $X_1$ is a group of the formula $$-X^\ominus \frac{M^{n\oplus}}{n},$$

X is a $SO_3$ or $CO_2$ group, M is a bivalent metal atom, n is 2, and $Y_1$ is a hydrogen or chlorine atom or a methyl group.

2. An azo pigment according to claim 1 of the formula

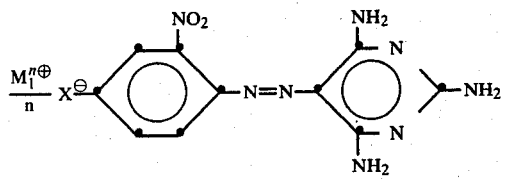

wherein X is a $SO_3$ group, and $M_1$ is Ba, Ca, Mg, Ni or Co, and n is 2.

3. An azo pigment according to claim 1 of the formula

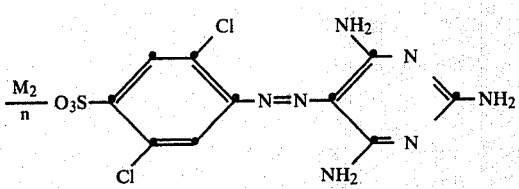

wherein $M_2$ is Mg, Ca or Sr, and n is 2.

4. A process for the production of an azo pigment according to claim 1 which comprises treating a compound of the formula

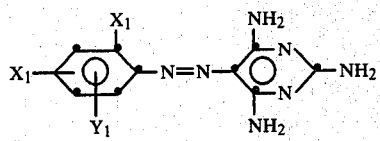

wherein one $X_1$ is a nitro group, a chlorine atom, a sulfo group or a trifluoromethyl group, and the other $X_1$ is a group of the formula —XH, X is a $SO_3$ or $CO_2$ group, and $Y_1$ is a hydrogen or chlorine atom or a methyl group; with a bivalent metal donor agent.

5. A process according to claim 4, wherein the starting material is a compound of the formula

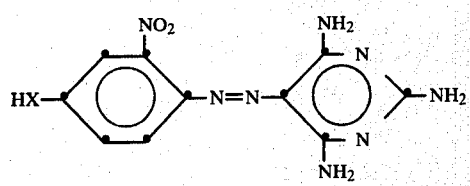

wherein X is a $SO_3$ or $CO_2$ group.

6. A process according to claim 4, wherein the metal donors are salts of barium, calcium, magnesium, nickel or cobalt.

7. A process according to claim 4, wherein the starting material is the sulfonic acid of the formula

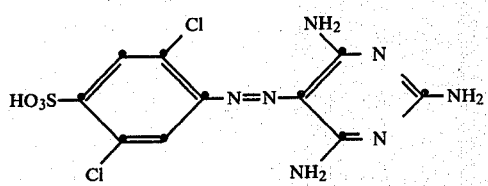

8. A method of pigmenting organic material of high molecular weight, which comprises the use of a metal salt according to claim 1.

9. Organic material of high molecular weight containing a metal salt according to claim 1.

* * * * *

UNITED STATES PATENT AND TRADEMARK OFFICE
CERTIFICATE OF CORRECTION

PATENT NO. : 4,340,430
DATED : July 20, 1982
INVENTOR(S) : ARMAND ROUECHE

It is certified that error appears in the above—identified patent and that said Letters Patent is hereby corrected as shown below:

Claim 2, column 5, line 53 reads:

wherein X is a $SO_3$ group, and $M_1$ is Ba, Ca, Mg, Ni or

Should read:

-- wherein X is a $SO_3$ or $CO_2$ group, and $M_1$ is Ba, Ca, Mg, Ni or --

Signed and Sealed this

Fourteenth Day of September 1982

[SEAL]

Attest:

GERALD J. MOSSINGHOFF

Attesting Officer    Commissioner of Patents and Trademarks